June 3, 1952     F. E. ROGERS     2,599,017
RATTRAP

Filed April 8, 1948     3 Sheets–Sheet 1

Inventor
Frank E. Rogers

By *Clarence A. O'Brien and Harvey B. Jacobson*
Attorneys

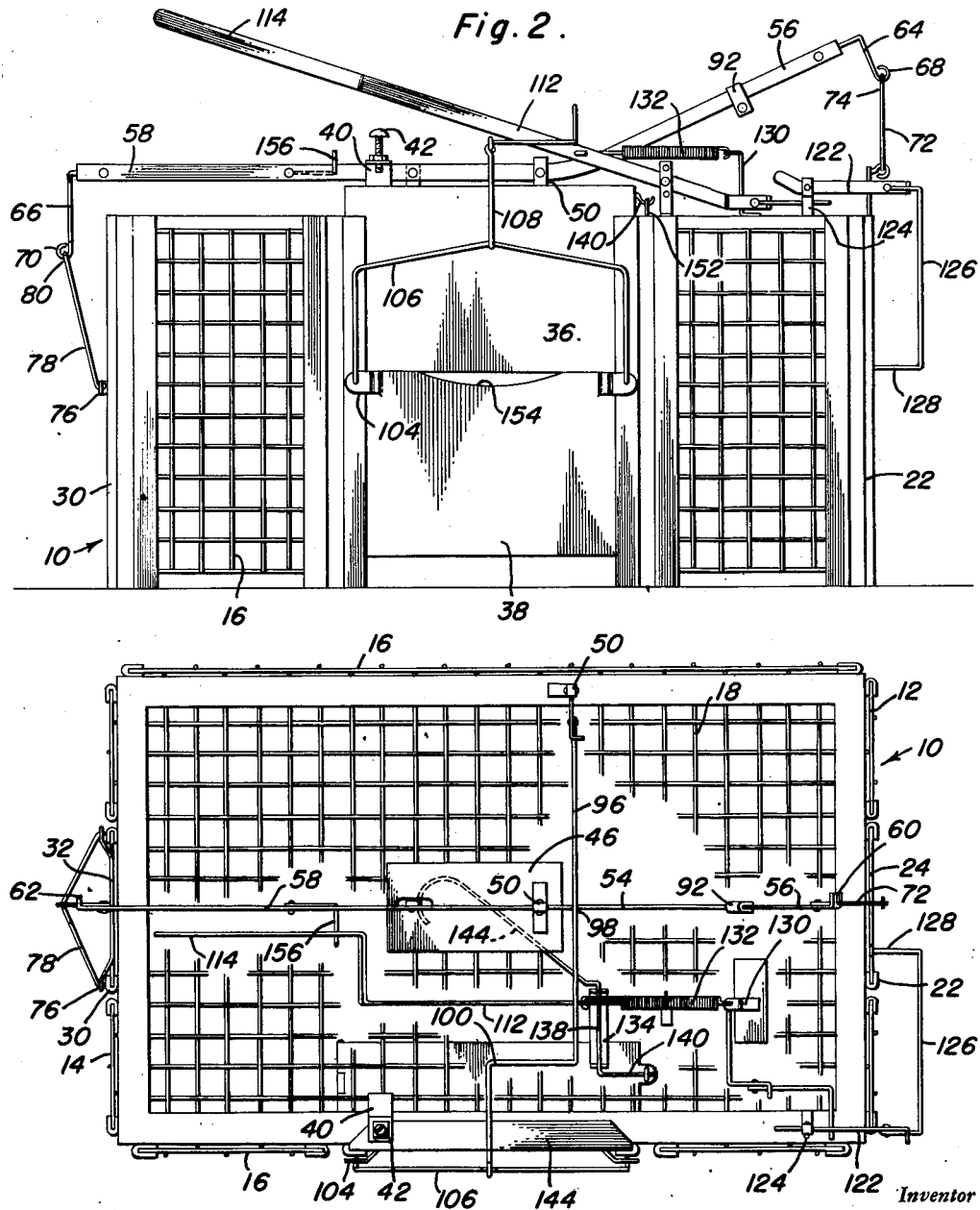

June 3, 1952  F. E. ROGERS  2,599,017
RATTRAP
Filed April 8, 1948  3 Sheets-Sheet 3
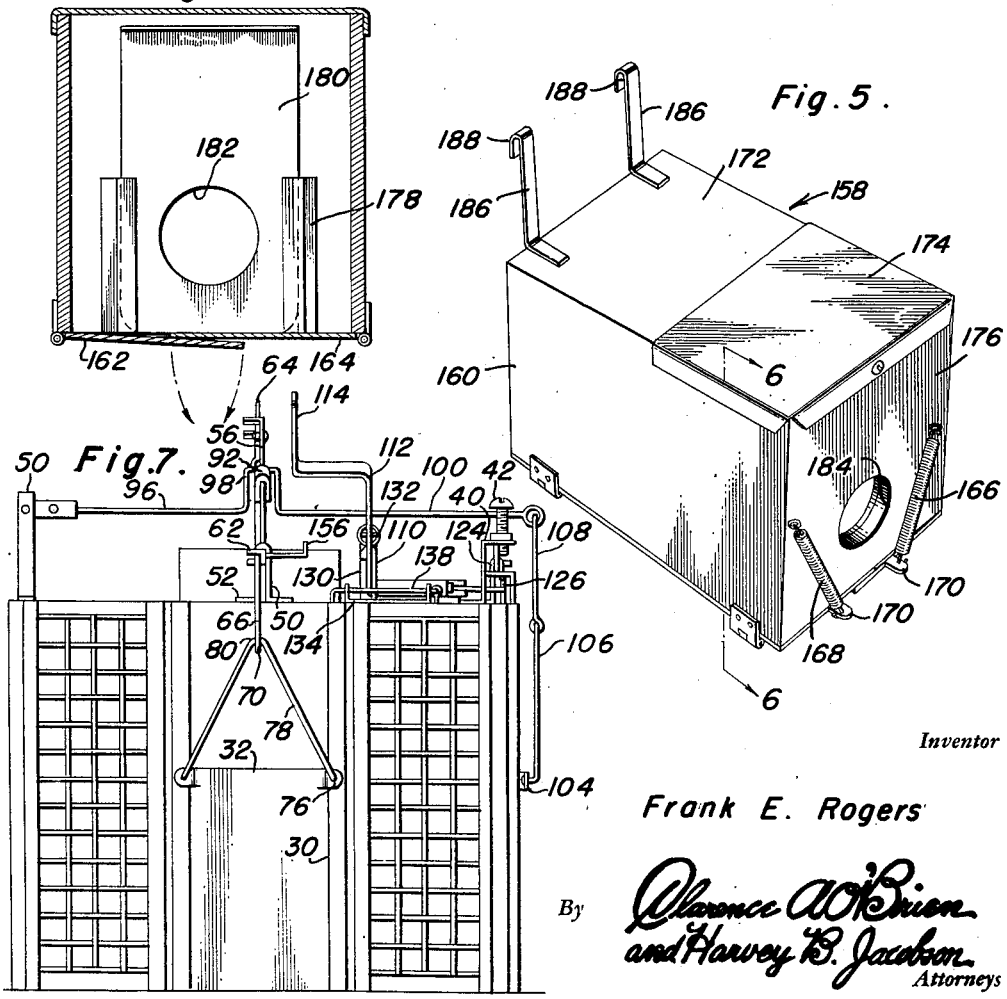
Inventor
Frank E. Rogers Patented June 3, 1952

2,599,017

UNITED STATES PATENT OFFICE 2,599,017

RATTRAP

Frank E. Rogers, Patton, Pa.; Josephine Rogers, executrix of said Frank E. Rogers, deceased, assignor to herself individually Application April 8, 1948, Serial No. 19,829

8 Claims. (Cl. 43—61)

This invention relates to new and useful improvements in rat traps and the primary object of the present invention is to provide a rat trap including a forward door, a rear door, and embodying novel and improved means for holding the doors in a normally open position and for simultaneously actuating the doors to a closed position upon engagement therewith by a rodent or other such animal.

Another important object of the present invention is to provide a rat trap including a forward door, a rear door and a pivotal lever connecting the doors for simultaneously opening and closing thereof.

Another object of the present invention is to provide a rat trap including an entrance door slidably carried by a cage, a holding device for normally retaining the door in an open position until such time as a rodent engages the same, and novel and improved means operated by a rodent trapped in the cage for re-setting the holding device as the rodent enters a disposal chamber or passes through an exit opening.

Another object of the present invention is to provide a rat trap including a pair of doors adjustably bound so that the same will be normally in a closed position and embodying novel and improved means for forcing the doors to an open position.

Another object of the present invention is to provide a trap including an entrance door that is actuated by a holding lever to a closed position and which is re-set or forced to an open position for trapping another rodent as the trapped rodent passes through an exit into a disposal chamber.

Another object of the present invention is to provide a trap including an entrance door and novel and improved means for re-setting the door in an open position automatically by an animal trapped in the cage or manually from a position exteriorly of the cage.

A further object of the present invention is to provide a rat trap having a novel and improved exit chamber removably applied thereto including a hinged bottom that will open under the weight of a trapped animal to release the animal into a suitable receptacle containing a fluid medium for killing the animal.

A still further aim of the present invention is to provide a rat trap that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a side elevational view of the present invention;

Figure 3 is a top plan view of Figure 2, and with parts broken away and shown in section;

Figure 4 is a front elevational view of Figure 2, and showing the forward door in a raised and open position;

Figure 5 is a perspective view of the exit or disposal chamber used in conjunction with the present invention; and, Figure 6 is a transverse vertical sectional view taken substantially on the plane of section line 6—6 of Figure 5.

Figure 1:
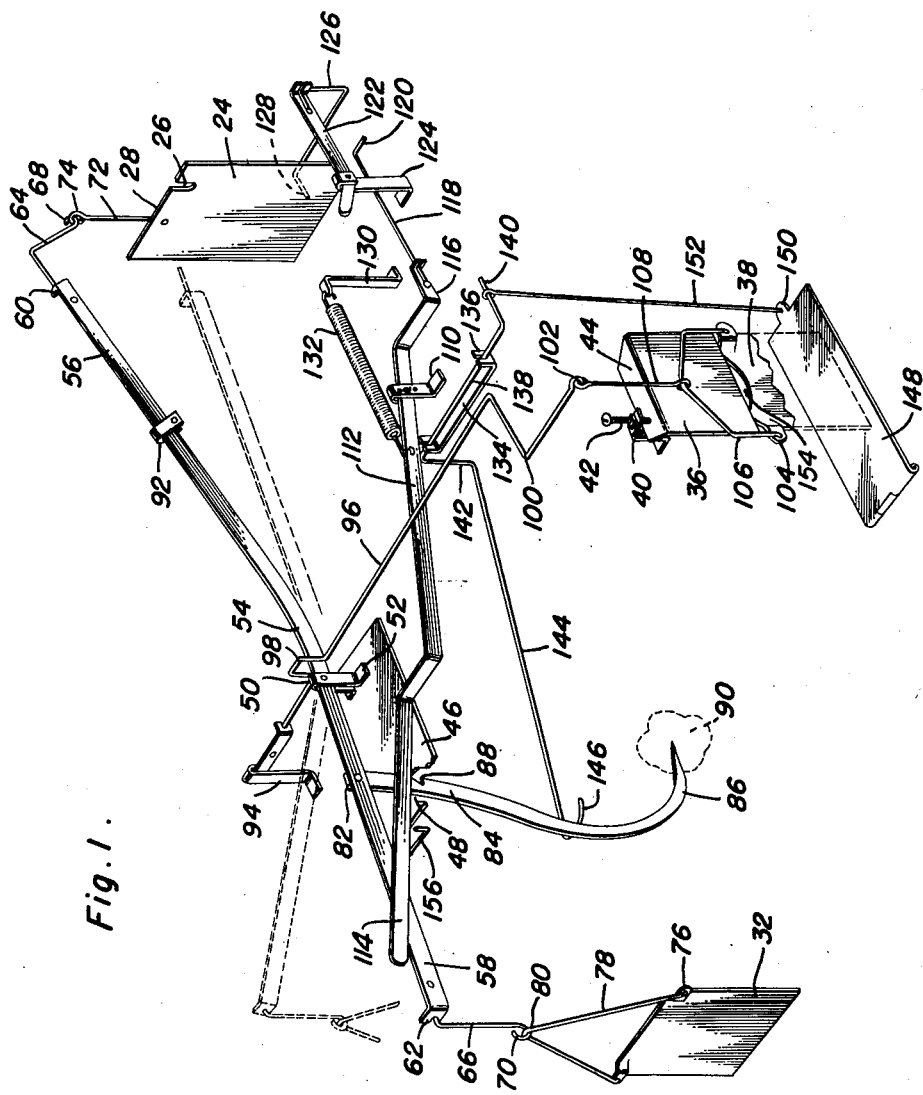
Figure 1 is a perspective view of the present invention removed from the cage portion thereof, and showing the forward door and rear door in an open position.

Referring now to the drawings in detail, wherein for the purpose of illustration, there is disclosed a preferred embodiment of the present invention, the numeral 10 represents a substantially rectangular cage, comprising a forward screened panel 12, a rear screened panel 14, a pair of side screened panels 16, and an upper preferably screened panel 18.

The forward panel 12 is provided with a substantially vertical and rectangular entrance opening 20, the sides of which are defined by spaced parallel channel guide tracks 22 that slidably engage a forward or entrance door 24 having a notch 26 in its upper edge 28 for a purpose which will later be more fully apparent.

The rear panel 14 is also provided with a substantially rectangular opening at its upper portion the vertical sides of which are defined by a pair of spaced parallel substantially vertical guide tracks 30 that slidably engage a substantially rectangular rear door 32.

One of the side panels 16 is formed with a vertical opening and fixed to the side panels 16 adjacent the opening therein, is a further pair of spaced parallel substantially vertical, channeled guide tracks 34 that engage a fixed upper section 36 and a slidable lower section or side exit door 38. An angulated bracket 40 is fixed to the upper panel or wall 18 of the cage 10 and adjustably supports a set-screw 42 that engages the flanged portion 44 of the upper section 36 to hold the said upper section 36 relative to the side panels 16.

Fixed to the upper panel 18 of the cage 10, is a base plate 46 having a longitudinal slot or opening 48 therein. Supported on the base plate 46 is an inverted substantially U-shaped bracket 50 having out-turned ends 52 that are secured on the base plate. Pivoted between the spaced legs of the bracket 50, is a bellcrank lever 54 that extends longitudinally between the forward panel 12 and the rear panel 14, and which is provided with upwardly and outwardly diverging arms 56 and 58, one of which, for example 56, is designated as a forward arm and the remaining arm, namely arm 58, is designated a rear arm. The terminals 60 and 62 of the arms 56 and 58 are angulated and slotted to engage one end of a pair of angulated connecting members 64 and 66 that are removably secured to the arms 56 and 58 in any suitable manner. The lower ends of the connecting members 64 and 66 terminate in hooks 68 and 70.

Fixed to the forward door 24, is an upstanding post 72 having an eye portion 74 that engages the hook 68, and fixed to a pair of offset integral ears 76 carried by the rear door 32, are the ends of an inverted V-shaped member 78, the web portion or central portion 80 of which engages the hook 70 of the rear connecting member 66.

Pivoted to the arm 58 of the lever 54, is the upper end 82 of a depending holding member 84 that slidably engages the slot 48 in the base plate 46. This member 84 terminates in an arcuate and pointed bait supporting member or hook 86. The holding member 84 is notched as at 88 to engage the lower surface of the plate 46 normally, thus holding the forward door 24 in a raised position and the rear door 32 in a lowered position, it being understood that the openings in the forward panel 12 and the rear panel 14 are so arranged that when the forward door is raised the same is in an open position, and when the rear door is lowered, it is also in an open position.

When an animal such as a rodent or the like engages the bait 90 on the hook 86, the holding member 84 will be pivoted rearwardly to effect a disengagement of the notch 88 with plate 46, and the forward end 56 of the lever 54 will rock downwardly closing the forward opening and simultaneously raising and closing the rear door 32.

For the purpose of adjusting and maintaining a proper balance or balancing action between the forward door 24 and rear door 32, whereby the forward door 24 will overbalance the rear door 32, there is provided a slidable and adjustable counterweight 92 on the forward arm 56 of the lever 54.

Fixed on the upper panel 18, is an upstanding support 94 that engages one end of a hanger rod 96 having a vertical, substantially U-shaped offset portion 98 that loosely engages the lever 54, and an angulated or horizontal offset end portion 100 that terminates in an eye 102. Suitably secured to offset ears 104 integrally formed with the side door 38, are the ends of an inverted substantially U-shaped member 106 that is detachably connected to the eye 102 by a connecting link 108.

Pivotally secured to a bracket 110 that is fixed on the upper panel 18, is a rocking lever 112 having a handle portion 114 at its rear end and an offset forward end 116 that removably supports a forwardly extending actuating bar 118 having an angulated contact end portion 120 that engages a pivoted locking lever 122 mounted on a support bracket 124 which is fixed on the upper panel 18. This locking lever 122 removably supports a locking bar 126 having an angulated end portion 128 that frictionally bears against the outer surface of the door 24 when the said door 24 is in a raised position, and which extends through the notch 26 to lock the door 24 in a closed position when the forward door 24 is lowered.

Fixed at one end to a support bracket 130 mounted on the upper panel 18, is a coil spring 132 the free end of which is anchored to the locking lever 112 to retain the handle portion 114 thereof in a normally raised position. It should be noted that the hanger rod 96 overlies and is disposed at right angles to the locking lever 112 for a purpose which will later be more fully apparent.

The numeral 134 represents a U-shaped support member, which is disposed transversely of the cage 10, which is formed with upstanding slotted legs 136 for pivotally and removably engaging a rockable bar 138 having a forwardly turned end 140 and a downwardly turned end 142 that terminates in a longitudinally extending contact bar 144 having a hook 146 at one end that engages the bait supporting hook 86.

Pivotally carried by the side panel 16, adjacent and below the side door 38, is a pressure plate or treadle 148 having an ear 150 projecting therefrom that engages a link 152 depending from the end 140 of the bar 138.

In practical use of the present invention, the forward door is raised and opened, the rear door 32 is lowered and opened, and the notch 88 of the member 84 engages the plate 46. As an animal entering the cage 10 engages the bait 90, the member 84 is pivoted rearwardly and the notch 88 disengages the plate 46 so that the weight of the door 24 will cause the same to slide downwardly to a closed position and the door 32 will be raised simultaneously to a closed position. During the closing of the doors 24 and 32, the end 128 of the locking bar 126 will enter the notch 26 and be disposed beneath the upper panel 18 to prevent either of the doors 24 from being opened.

The animal trapped in the cage 10 will attempt to locate the weakest part of the cage to exit therefrom and will observe that there is an opening 154 between the side door 38 and upper section 36. The trapped animal will then force himself between the side door 38 and section 36 pulling the handle portion 114 of the lever 112 downwardly whereby the end 120 of the bar 118 will pivot the locking lever 122 upwardly at its forward end to disengage the end 128 of the locking bar 126 from the notch 26, and the handle portion 114 of the lever 112 will engage a contact bar 156 carried by the rear arm of the lever 54 to force the arm 58 downwardly and hence the door 24 will be raised and opened and the door 32 lowered and opened to accommodate a further animal which might enter the cage.

Should the animal trying to exit between the door 38 and section 36 attempt to re-enter the cage 10, he will engage the treadle 148 which will raise the bar 144 to engage the member 84 which will again lower the door 24 and raise the door 32.

Obviously, the door 38 may be replaced by a fixed section so that the present rat trap will function to trap rodents and the like within the cage 10. In this manner, the doors must be positioned in an open position manually since the rodent will not automatically re-set the doors. It should be noted, that when the door 24 is again raised and the forward arm 56 of the lever 54 pivoted upwardly, the member 84 will pivot forwardly so that the notch 88 formed therein will engage the base plate 46 to again retain and hold the doors, namely, doors 24 and 32 in an open position.

Although the device previously described could function efficiently and effectively in trapping a large number of rodents or other such animals therein, it is possible with the structure set forth to provide an additional means for directing the animals passing through the exit opening in the side of the cage to a container holding a suitable fluid medium which will drown or otherwise kill the animals.

In order to accomplish this latest feature, there is provided a disposal chamber designated generally by the numeral 158. This disposal chamber 158 includes a substantially rectangular housing or compartment 160 that is open at its inner end to communicate with the opening in the side panel 16 of the cage 10. Pivoted to the open bottom of the housing 160, is a pair of overlapping doors 162 and 164 that are retained in a raised and closed position by coil springs 166 and 168 that are anchored to the housing 160 and to ears 170 projecting from the doors 162 and 164. The upper wall 172 of the housing 160 is notched and is closed by a removable closure plate 174 that facilitates visibility into the housing 160 when the same is removed. The outer wall 176 of the housing 160 is provided on the inner face thereof with a pair of guide tracks 178 that slidably engage a closure plate 180 having an opening 182 therein that opposes an opening 184 provided in the wall 176 when the doors 162 and 164 are in a raised and closed position.

Rigidly secured to the upper wall 172 of the housing 160, is a pair of hanger straps 186 having hooks 188 formed at their upper ends that are adapted to engage the open upper ends of the channels 22 of the side door 38 for holding the housing 160 positioned relative to the side panel 16 and more particularly, to the opening therein.

When the housing 160 is applied to the cage 10, the animal passing between the side door 38 and upper section 36 will see an opening that is formed by the openings 182 and 184 and will attempt to pass through the said openings to escape from the trap or cage 10. Upon entering the housing 160, the weight of the animal will effect an opening or downward pivotal movement of the doors 162 and 164 and the said animal will fall into a suitable container (not shown) filled with a fluid medium for drowning or killing the said animal. It is noted that the housing 160 is quickly and readily removed from engagement with the side panel 16 in a convenient manner and may or may not be used in conjunction with the cage construction illustrated in Figures 1–4. It has been found that by so applying the housing 160 to the cage 10, the same will afford a lure insofar as the animal trapped in the cage 10 will attempt to enter the said housing 160.

As illustrated in the drawings, it is preferred that each of the panels, namely, the forward panel 12, the rear panel 14, and the side panel 16, be formed of a plurality of separable screened sections so that the same could be replaced with slidable closures during the trapping of certain types of animals. However, for use in trapping rodents the screen partitions are desirable, since by their construction the entire cage could be conveniently inserted into a suitable vat for the drowning of the rodents. In this regard, it is preferred that the present cage be constructed of a material that is rust-proof or which is painted with a rust-proof coating to further preserve and add to the durability of the present trap.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A trap comprising a cage including a forward panel, a rear panel and side panel, a forward door slidably carried by the forward panel, a rear door slidably carried by the rear panel, means operatively connecting the doors to each other for simultaneous opening and closing movements of the forward door and rear door, means for holding the forward door and rear door in a normal open position, a trip mechanism for releasing the holding means, a gravity actuated locking mechanism for holding the doors in a locked position, and a side door connected to the locking mechanism for releasing the locking mechanism upon opening of the side door.

2. A trap comprising a cage having a forward panel, a rear panel and side panels, a vertically slidable forward door carried by the forward panel, a vertically slidable rear door carried by the rear panel, said forward door being open when raised, said rear door being open when lowered, a bellcrank lever pivotally carried by the cage and connected to the forward door and rear door, balancing means carried by the lever normally retaining the forward door in a lowered position and the rear door in a raised position, means for releasing the retaining means, a locking mechanism for holding the forward door in a locked position, and means for releasing the locking mechanism, said last named means including a side door and linkage connecting said side door to said locking mechanism.

3. A trap comprising a cage having a forward panel, a rear panel and side panels, a vertically slidable forward door carried by the forward panel, a vertically slidable rear door carried by the rear panel, said forward door being open when raised, said rear door being open when lowered, a bellcrank lever pivotally carried by the cage and connected to the forward door and rear door, balancing means carried by the lever normally retaining the forward door in a lowered position and the rear door in a raised position, a bait supporting member pivotally carried by the lever, a base plate carried by the cage having a slot receiving the bait supporting member, said bait supporting member having a notch adapted to receive the plate for retaining the forward door in a raised and open position and the rear door in a lowered and open position, said bait supporting member being adapted to disengage the plate upon contact of a rodent therewith to close the forward door and the rear door, a locking mechanism for holding the forward door in a closed position, and means for releasing the locking mechanism.

4. The combination of claim 3 wherein said last mentioned means includes a side door slidably carried by the side panel, and means operatively connecting the side door to the locking mechanism.

5. A rat trap comprising a cage having a forward door, a rear door and a side door, said doors being mounted on said cage for vertical sliding movement, a substantially V-shaped rock lever pivotally mounted at its apex on said cage and connected to said forward and rear doors, said forward door being closed when lowered and said rear door being closed when raised, means on the end portion of said lever connected to the forward door urging said door to their closed position, a base plate mounted on said cage, a swingable holder pivoted to said lever and having a notch adapted to receive the plate to hold the forward and rear doors open, said holder being engageable by a rodent to move the holder from the plate whereupon the forward and rear doors will move to their closed positions, a locking member carried by the cage for locking the forward and rear doors in a closed position, a rocking member on said cage for releasing said locking member and for also rocking the lever to urge the forward and rear doors to an open position, a means operated upon opening of the side door for actuating said rocking member, and a further means disposed adjacent the side door for urging the holder away from the plate.

6. A rat trap comprising a cage having a forward door, a rear door and a side door, said doors being mounted on said cage for vertical sliding movement, a rock lever pivotally mounted on said cage and connected to said forward and rear doors, said forward door being closed when lowered and said rear door being closed when raised, a base plate mounted on said cage, a swingable holder pivoted to said lever and having a notch adapted to receive the plate to hold the forward and rear doors open, said holder being engageable by a rodent to move the holder from the plate and thereby permit movement of the forward and rear doors to their closed position, a locking member carried by the cage for locking the forward and rear doors in a closed position, a rocking member on said cage for releasing said locking member and for also rocking the lever to urge the forward and rear doors to an open position, a means operated upon opening of the side door for actuating said rocking member, a vertically swingable member having an end contacting said holder, a pivotal platform disposed adjacent said side door, and a connector between said platform and said vertically swingable member, said vertically swingable member urging the holder away from said plate upon depression of said platform by a rodent attempting to re-enter the cage through said side door.

7. A trap comprising a cage having an entrance and an exit, a first rock lever carried by said cage, a door connected to said lever for selectively opening and closing the entrance, a gravity actuated locking member for locking the door in its closed position, a second rock lever paralleling the first rock lever, said second lever having a portion adapted to engage and release said locking member with said door, spring means acting on said second lever and urging the portion of said second lever from said locking member, an arm projecting laterally from the first lever and underlying the second lever, means for holding the door in its open position, means at the exit adapted to release said holding means, and means also at said exit adapted to rock said second lever in order to permit release of said locking member with said door and to also cause the second lever to engage said arm and urge the first lever to its door opening position.

8. An animal trap comprising a cage having an entrance and an exit, a side door for selectively opening and closing the entrance, a rock lever on the cage and connected to said door for movement therewith, means carried by the lever for holding the door open, a locking member for locking the door closed, a rock member paralleling said lever for simultaneously releasing said locking member from said door and for swinging said lever to a position for opening the door, a spring acting on said rock member and urging the latter out of engagement with said locking member and said lever, a sliding side door for the exit, a swingable member extending transversely across and over the rock member and connected to the side door for rocking the rock member against action of said spring to a position for releasing the locking member with the entrance door and for swinging the lever to its door opening position, and animal actuated means mounted at the exit for retaining the holding means inactive during engagement of said animal actuated by an animal.

FRANK E. ROGERS.

REFERENCES CITED

The following references are of record in the file of this patent:

UNITED STATES PATENTS

| Number | Name | Date |
|---|---|---|
| 78,029 | Trainer | May 19, 1868 |
| 978,742 | Hatchell | Dec. 13, 1910 |
| 1,126,801 | Lowrey | Feb. 2, 1915 |
| 1,404,327 | Spencer | Jan. 24, 1922 |
| 1,442,252 | Coleman | Jan. 16, 1923 |
| 2,232,604 | Helmick | Feb. 18, 1941 |